United States Patent [19]

Flynn

[11] 3,855,022
[45] Dec. 17, 1974

[54] PARTICULATE ALUMINUM HYDRIDE WITH NITROCELLULOSE COATING SUITABLE FOR USE IN SOLID PROPELLANTS

[75] Inventor: James P. Flynn, Midland, Mich.

[73] Assignee: The Dow Chemical Company, Midland, Mich.

[22] Filed: May 14, 1965

[21] Appl. No.: 457,252

[52] U.S. Cl. ............... 149/8, 149/19.8, 264/3 E
[51] Int. Cl. ............................................. C06d 5/06
[58] Field of Search ................ 149/5, 6, 7, 8, 19.8; 264/3 E

[56] References Cited
UNITED STATES PATENTS

| | | |
|---|---|---|
| 1,971,502 | 8/1934 | Piccard ................................ 149/6 |
| 3,035,948 | 5/1962 | Fox ..................................... 149/19 |
| 3,070,469 | 12/1962 | Jenkin .................................. 149/5 |
| 3,252,842 | 5/1966 | Williams ............................... 149/6 |

*Primary Examiner*—Benjamin R. Padgett
*Attorney, Agent, or Firm*—C. Kenneth Bjork

[57] ABSTRACT

Crystalline particulates of non-solvated aluminum hydride are coated with nitrocellulose which is applied from a solution of nitrocellulose or a plasticized composition containing nitrocellulose. The total amount of coating on the aluminum hydride may range from 5 to 50 percent of the total weight. The particulates provide superior ingredients for solid propellants.

3 Claims, No Drawings

PARTICULATE ALUMINUM HYDRIDE WITH NITROCELLULOSE COATING SUITABLE FOR USE IN SOLID PROPELLANTS

This invention relates to solid propellants and more particularly is concerned with a treatment for substantially non-solvated, particulate aluminum hydride which markedly improves its compatibility against degradation during storage by reaction with other ingredients of propellants and to the treated aluminum hydride composition itself.

Novel crystalline forms of non-solvated aluminum hydride as disclosed in copending applications Ser. No. 179,509, filed Mar. 8, 1962 and Ser. No. 234,277, filed Oct. 23, 1962, have been found to be particularly suitable for use as fuels in rocket propellant formulations. These products, however, many times when incorporated into a solid propellant undergo an initial reaction, usually with the plasticizer, e.g., a mixture of trimethylol ethane trinitrate and diethylene glycol dinitrate. This reaction is accompanied by the release of gases which form detrimental gas pockets and voids in the propellant grain.

Now, unexpectedly it has been found that the compatibility of the useful substantially non-solvated aluminum hydride fuel components in certain solid propellants is markedly increased by coating these fuel particles with nitrocellulose.

Ordinarily, the treatment of the substantially non-solvated aluminum hydride with the nitrocellulose is accomplished by contacting the hydride material with a solution of the nitrocellulose or a plasticized composition containing the nitrocellulose coating member. Conveniently the aluminum hydride is immersed in the nitrocellulose liquid or is otherwise contacted, mixed, blended or coated with this member.

A particularly effective composition is a plasticized mixture of the nitrocellulose with nitrated plasticizers such as diethyleneglycol dinitrate, triethyleneglycol dinitrate, trimethylolethane trinitrate or mixtures thereof. This composition offers the added advantage that there is no need to remove the plasticizer from the composition subsequent to coating the particular aluminum hydride and before use in a propellant composition as the nitrate plasticizers themselves are useful in solid propellants to bind and hold the fuel and oxidizer components.

Alternatively, solvents, e.g., alkanol-ether mixtures such as ethanol-diethyl ether, n-propanoldiethyl ether, ethanol-diisopropyl ether, ethanol-tetrahydrofuran and the like can be used to carry the nitrocellulose and/or plasticized nitrocellulose and these solvents then be removed by evaporation after contact of the coating solution and the fuel.

The total amount of coating provided on the aluminum hydride ordinarily ranges from about 5 to about 50 per cent of the total sample weight. The higher weight coatings are most readily achieved with the plasticized nitrocellulose while thinner, i.e., lower weight, coatings result from use of the solutions having the more volatile solvents.

The following Examples will serve to further illustrate the present invention but are not meant to limit it thereto.

EXAMPLE 1

The decomposition rate of a particulate α-aluminum hydride of the type identified more fully in application Ser. No. 179,509, filed Mar. 8, 1962, was evaluated at various temperatures using a Taliani standard manometric gas-evolution test apparatus.

In this study, weighed samples of (1) the uncoated aluminum hydride, (2) nitrocellulose coated aluminum hydride (nitrocellulose plasticized with an 85 parts by weight trimethylolethane tetranitrate-15 parts by weight diethylene glycol dinitrate mixture) and (3) aluminum hydride which had been mixed with the nitrated plasticizer mixture alone were evaluated separately at 50°C. for a test period of about 30 days. The plasticized nitrocellulose coating was applied from a diethyl ether-ethanol solution to give a 5 per cent by weight coating of the nitrocellulose on the aluminum hydride. The experimental data and results of this study are presented in Table I which follows.

Table I

| Test Period (days) | Gas Evolution — Cubic Centimeters, Total (α-Aluminum Hydride) | | |
|---|---|---|---|
| | Nitrocellulose Coated [1] | Nitrated Plasticizer Mixture [2] | Aluminum Hydride Alone [3] |
| 5 | 0.36 | 0.14 | 0.14 |
| 10 | 0.48 | 0.24 | 0.24 |
| 15 | 0.58 | 0.36 | 0.36 |
| 20 | 0.66 | 0.84 | 0.66 |
| 25 | 0.70 | 1.66 | 1.08 |
| 30 | 0.74 | 3.56 | 1.90 |

[1] 0.25 g. α-aluminum hydride + 0.5 g. 85/15 trimethylolethane tetranitrate/diethylene glycol dinitrate + 0.17 g. plastisol grade nitrocellulose.
[2] 0.25 g. α-aluminum hydride + 0.5 g. 85/15 trimethylol ethane tetranitrate/diethylene glycol dinitrate.
[3] 0.25 g. α-aluminum hydride
(All aluminum hydride samples were taken from the same lot.)

EXAMPLE 2

A particulate α-aluminum hydride was incorporated into a nitrosol double base propellant to provide a final composition containing 50 weight per cent nitrosol, 29 weight per cent aluminum hydride and 21 weight per cent ammonium perchlorate. The nitrosol consisted of about 20 weight per cent nitrocellulose and about 80 weight per cent of a mixture of about 15 parts by weight diethylene glycol dinitrate and about 85 parts by weight trimethylolethane trinitrate.

Triplicate samples of the resulting blended propellant were tested for a three month period both at 50° C. and 60° C. Per cent decomposition of the hydride was calculated from the pressure data obtained in the standard gas evolution apparatus and from the analysis of the evolved gases.

As a control, uncoated α-aluminum hydride from the same lot was similarly tested.

The results of these studies are summarized in Table II which follows:

Table II

| Days on Test | % α-Aluminum Hydride Decomposition | | | |
|---|---|---|---|---|
| | In Propellant Composition | | Aluminum Hydride Alone | |
| | 50°C. | 60°C. | 50°C. | 60°C. |
| 10 | 0.10 | 0.20 | 0.10 | rapid decomposition |
| 20 | 0.15 | 0.32 | 0.40 | do. |
| 30 | 0.18 | 0.41 | rapid decomposition | do. |
| 40 | 0.20 | 0.52 | do. | do. |

Table II-Continued

| Days on Test | % α-Aluminum Hydride Decomposition | | | |
| --- | --- | --- | --- | --- |
| | In Propellant Composition | | Aluminum Hydride Alone | |
| | 50°C. | 60°C. | 50°C. | 60°C. |
| 50 | 0.21 | 0.61 | do. | do. |
| 90 | 0.30 | 0.63 | do. | do. |

Various modifications can be made in the present invention without departing from the spirit or scope thereof for it is understood that I limit myself only as defined in the appended claims.

I claim:

1. A substantially non-solvated particulate aluminum hydride having a surface coating of nitrocellulose.

2. A substantially non-solvated particulate aluminum hydride having a surface coating of nitrocellulose, said coating ranging from about 5 to about 50 per cent of the weight of the coated aluminum hydride product.

3. A process for treating the surface of a substantially non-solvated particulate aluminum hydride which comprises;
   a. contacting a substantially non-solvated particulate aluminum hydride with nitrocellulose, and
   b. maintaining said aluminum hydride and said nitrocellulose in contact for a predetermined period of time thereby to provide a surface coating of said nitrocellulose on said aluminum hydride.

* * * * *